(12) United States Patent
Kumagai et al.

(10) Patent No.: US 10,992,352 B2
(45) Date of Patent: Apr. 27, 2021

(54) BASE STATION APPARATUS, SELECTION METHOD, AND TERMINAL DEVICE

(71) Applicant: FUJITSU LIMITED, Kawasaki (JP)

(72) Inventors: Shinya Kumagai, Machida (JP); Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/551,434

(22) Filed: Aug. 26, 2019

(65) Prior Publication Data

US 2020/0099421 A1    Mar. 26, 2020

(30) Foreign Application Priority Data

Sep. 20, 2018 (JP) .............................. JP2018-175599

(51) Int. Cl.
*H04W 72/12* (2009.01)
*H04B 7/0452* (2017.01)
*H04B 7/06* (2006.01)

(52) U.S. Cl.
CPC ......... *H04B 7/0452* (2013.01); *H04B 7/0695* (2013.01); *H04B 7/0697* (2013.01); *H04W 72/1226* (2013.01); *H04W 72/1247* (2013.01)

(58) Field of Classification Search
CPC ...... H04B 7/0452; H04B 7/06; H04B 7/0697; H04B 7/0695; H04W 72/12; H04W 72/1247; H04W 72/1226
See application file for complete search history.

(56) References Cited

U.S. PATENT DOCUMENTS

2013/0301454 A1* 11/2013 Seol ..................... H04B 7/0695
 370/252
2014/0334566 A1* 11/2014 Kim ..................... H04B 7/0469
 375/267

(Continued)

FOREIGN PATENT DOCUMENTS

EP           3419189 A1    12/2018
JP        2009-200824 A     9/2009

(Continued)

OTHER PUBLICATIONS

Tateishi, K. et al., "Performance Analysis on MU-MIMO beamforming for 5G Radio Access", The Institute of Electronics, Information and Communication Engineers (IEICE) Technical Report, RCS2016-230, vol. 116, No. 383, pp. 123-128, (Dec. 2016).

*Primary Examiner* — Chi Ho A Lee
(74) *Attorney, Agent, or Firm* — Arent Fox LLP

(57) ABSTRACT

A base station apparatus includes a transmitter configured to generate a plurality of beams by a plurality of antenna elements so as to transmit a data signal addressed to a plurality of terminal devices, a memory, and a processor coupled to the memory and configured to select, for each terminal device, a combination of terminal devices to which the data signal is transmitted by spatially multiplexed, based on information in which a first beam group including a first beam in which a reception quality of each terminal device is maximized among the plurality of beams is associated with a second beam group including a second beam in which a difference from the reception quality of the first beam is equal to or larger than a predetermined value among the plurality of beams.

6 Claims, 11 Drawing Sheets

(56) References Cited

U.S. PATENT DOCUMENTS

| | | | |
|---|---|---|---|
| 2016/0056871 A1* | 2/2016 | Kakishima | H04B 7/0456 |
| | | | 370/336 |
| 2018/0159600 A1* | 6/2018 | Kim | H04B 7/0658 |
| 2018/0205533 A1* | 7/2018 | Lee | H04L 5/1461 |
| 2018/0316397 A1 | 11/2018 | Okuyama et al. | |
| 2019/0132828 A1* | 5/2019 | Kundargi | H04W 72/1205 |
| 2019/0239233 A1* | 8/2019 | Ryu | H04W 72/0413 |
| 2019/0373595 A1* | 12/2019 | Sadiq | H04W 56/001 |
| 2020/0059867 A1* | 2/2020 | Haghighat | H04W 52/367 |
| 2020/0169962 A1* | 5/2020 | Fakoorian | H04L 1/0026 |
| 2020/0212971 A1* | 7/2020 | Shikida | H04B 7/0456 |
| 2020/0252966 A1* | 8/2020 | Wu | H04W 74/0808 |

FOREIGN PATENT DOCUMENTS

| | | |
|---|---|---|
| JP | 2009-232256 A | 10/2009 |
| JP | 2017-163500 A | 9/2017 |
| WO | WO-2018/030540 A1 | 2/2018 |

\* cited by examiner

FIG. 4

| TERMINAL NUMBER | OPTIMUM BEAM NUMBER | LOW INTERFERENCE BEAM NUMBER |
|---|---|---|
| TERMINAL #a | 1 | 3,4 |
| TERMINAL #b | 4 | 1,2 |
| TERMINAL #c | 3 | 1 |
| TERMINAL #d | 2 | 4 |
| TERMINAL #e | 1 | 4 |
| ... | ... | ... |

BASE STATION APPARATUS, SELECTION METHOD, AND TERMINAL DEVICE

CROSS-REFERENCE TO RELATED APPLICATION

This application is based upon and claims the benefit of priority of the prior Japanese Patent Application No. 2018-175599, filed on Sep. 20, 2018, the entire contents of which are incorporated herein by reference.

FIELD

The embodiments discussed herein are related to a base station apparatus, a selection method, and a terminal device.

BACKGROUND

As a technology of implementing an ultra-wide band transmission in a high frequency band, there is a massive multiple-input multiple-output (a Massive MIMO) technology with, for example, hundreds to thousands of antenna elements of a base station, which is extended from an MIMO technology in which about several tens of antenna elements are assumed. In the base station using the Massive MIMO, as in the MIMO technology, when a digital signal processing in a baseband such as, for example, only a digital precoding, is executed, a matrix operation of hundreds to thousands of dimensions is required in proportion to the number of antenna elements, and thus, the calculation amount becomes huge.

The base station that uses the Massive MIMO forms a beam in which a received power is increased in a specific direction, by a beam forming (BF) using a plurality of antenna elements. For example, the base station transmits a reference signal (mobility reference signal (MRS)) of a plurality of beam candidates. Each terminal feeds a received power of each beam which is measured from the reference signal received from the base station, back to the base station. The base station determines a beam for each terminal based on the feedback result from each terminal.

Further, for example, the base station that performs a multi-user (MU)-MIMO transmission in which signals for a plurality of user terminals are separated by beams, calculates a reception quality value of each terminal to which each beam is allocated, for each beam set based on a reception state value of each beam which is fed back from each terminal. The base station selects a terminal set for performing the MU-MIMO transmission based on the calculated reception quality values.

Related techniques are disclosed in, for example, Japanese Laid-open Patent Publication No. 2009-200824, which is referred to as Patent Document 1.

Related techniques are also disclosed in, for example, K. Tateishi, D. Kurita, A. Harada, and Y. Kishiyama "Performance Analysis on MU-MIMO Beamforming for 5G Radio Access," IEICE Technical Report, vol. 116, no. 383, RCS2016-230, pp. 123-128, December 2016.

SUMMARY

According to an aspect of the embodiments, a base station apparatus includes a transmitter configured to generate a plurality of beams by a plurality of antenna elements so as to transmit a data signal addressed to a plurality of terminal devices, a memory, and a processor coupled to the memory and configured to select, for each terminal device, a combination of terminal devices to which the data signal is transmitted by spatially multiplexed, based on information in which a first beam group including a first beam in which a reception quality of each terminal device is maximized among the plurality of beams is associated with a second beam group including a second beam in which a difference from the reception quality of the first beam is equal to or larger than a predetermined value among the plurality of beams.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory view illustrating an example of a list in the first embodiment;

DESCRIPTION OF EMBODIMENTS

Since the base station calculates a channel capacity of pairs of all beam sets and all terminal sets based on the reception quality values, a calculation amount required for the calculation becomes huge as the number of beams or the number of terminals increases. For example, in a case where the number of terminals U=100, the number of beams B=64, and the number of selected candidate terminals L=2, when the MU-MIMO transmission is performed (or the MU-MIMO is performed) with K (K=2) terminals, a calculation amount corresponding to $_BC_K*U*K=403,200$ times is required for a calculation of a signal to noise interference ratio (SINR) indicating a reception quality, and a calculation amount corresponding to $_BC_K*L^2=8,064$ times is required for a calculation of a channel capacity. As a result, when the number of beams or the number of terminals increases, the base station selects a beam set and a terminal set in which the channel capacity is maximized. That is, the calculation amount for selecting a terminal set for performing the MU-MIMO increases.

Hereinafter, embodiments of a technology capable of reducing the calculation amount will be described in detail based on the accompanying drawings. In addition, the disclosed technology is not limited by each of the embodiments. In addition, the embodiments to be described hereinbelow may be appropriately combined with each other within the scope that does not cause a contradiction.

First Embodiment

Figure 1:
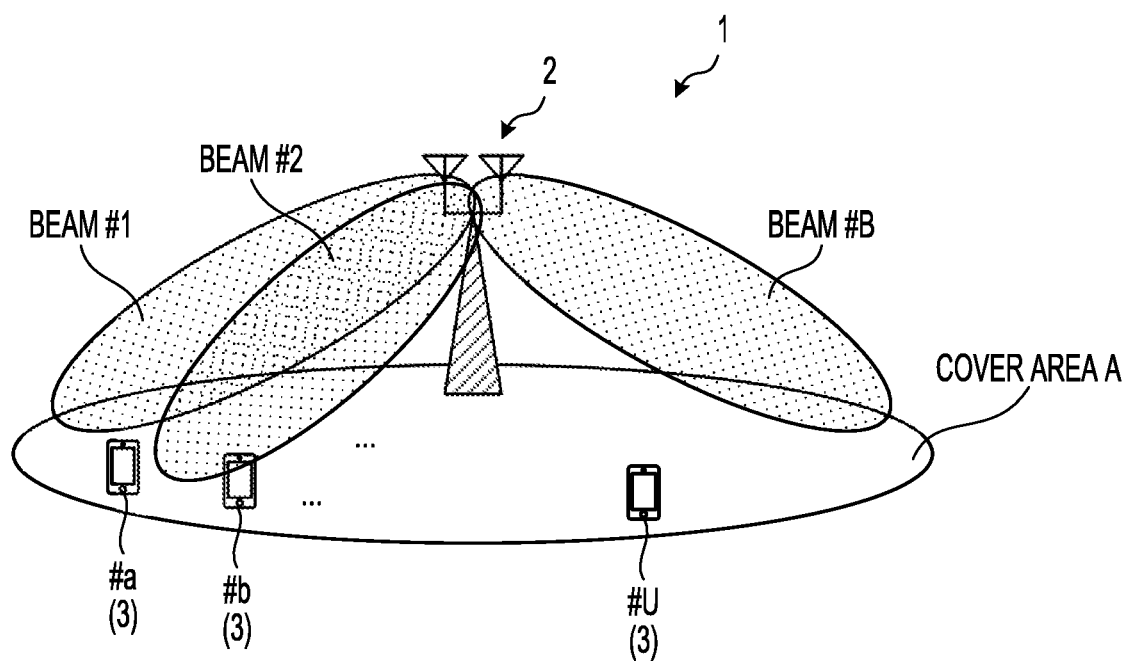
FIG. 1 is an explanatory view illustrating an example of a wireless system in a first embodiment.
Figure 2:
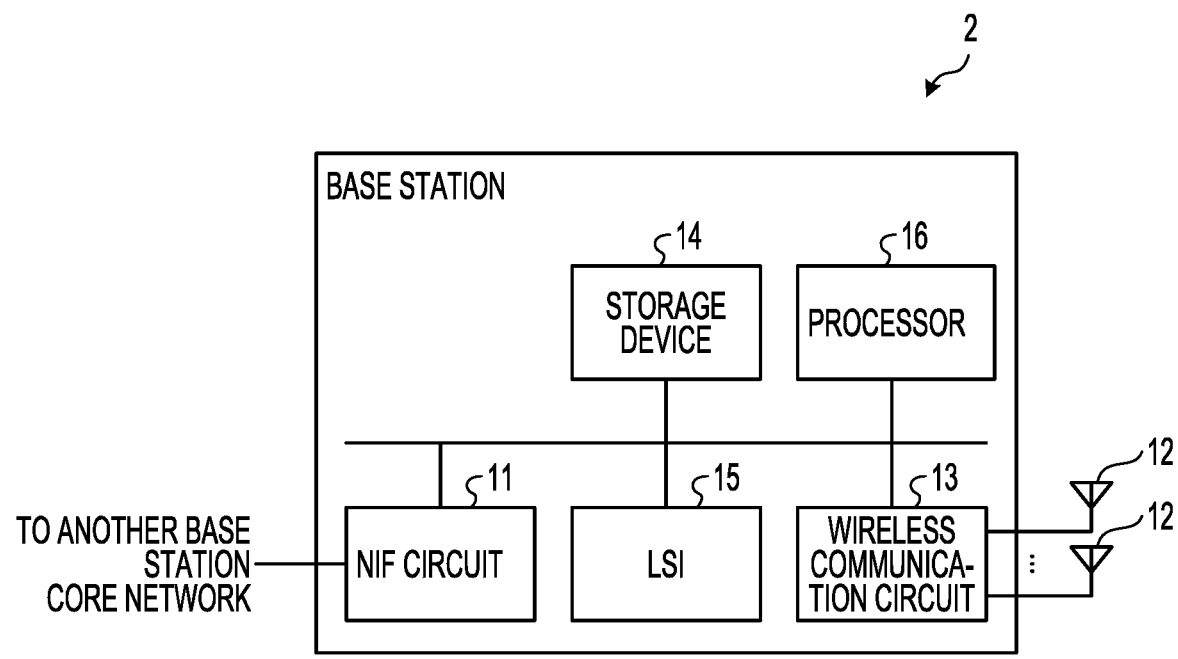
FIG. 2 is a block diagram illustrating an example of a hardware configuration of a base station in the first embodiment.

FIG. 1 is an explanatory view illustrating an example of a wireless system 1 in a first embodiment. The wireless system 1 illustrated in FIG. 1 includes a base station 2 and a plurality of terminals 3. The base station 2 is a base station apparatus that forms a cover area A with a plurality of beams #1, #2, ... #B by using N antenna elements 12 (as illustrated in FIG. 2). Further, the base station 2 wirelessly communicates with each of the terminals 3 located within the cover area A. Each of the terminals 3 is a terminal device such as, for example, a smart phone, that wirelessly communicates with the base station 2. The terminals 3 are, for example, terminals #a, #b, . . . #U. In addition, the wireless system 1 is a wireless system such as, for example, the long term evolution (LTE) or new radio (NR). The base station 2 spatially multiplexes a data signal and a reference signal by using the antenna elements 12 and transmits the spatially multiplexed signals to each terminal 3.

FIG. 2 is a block diagram illustrating an example of a hardware configuration of the base station 2 according to the first embodiment. The base station 2 illustrated in FIG. 2 includes a network interface (NIF) circuit 11, the plurality of antenna elements 12, a wireless communication circuit 13, a storage device 14, a large scale integration (LSI) 15, and a processor 16. The NIF circuit 11 is an interface (IF) circuit that is in charge of performing a wired communication with a core network connected to other base stations 2. The wireless communication circuit 13 is an IF circuit that is in charge of performing a wireless communication with the terminals 3 via the antenna elements 12. The storage device 14 is a device that stores various pieces of information. The LSI 15 is a circuit that executes various controls. The processor 16 controls the entire base station 2.

Figure 3:
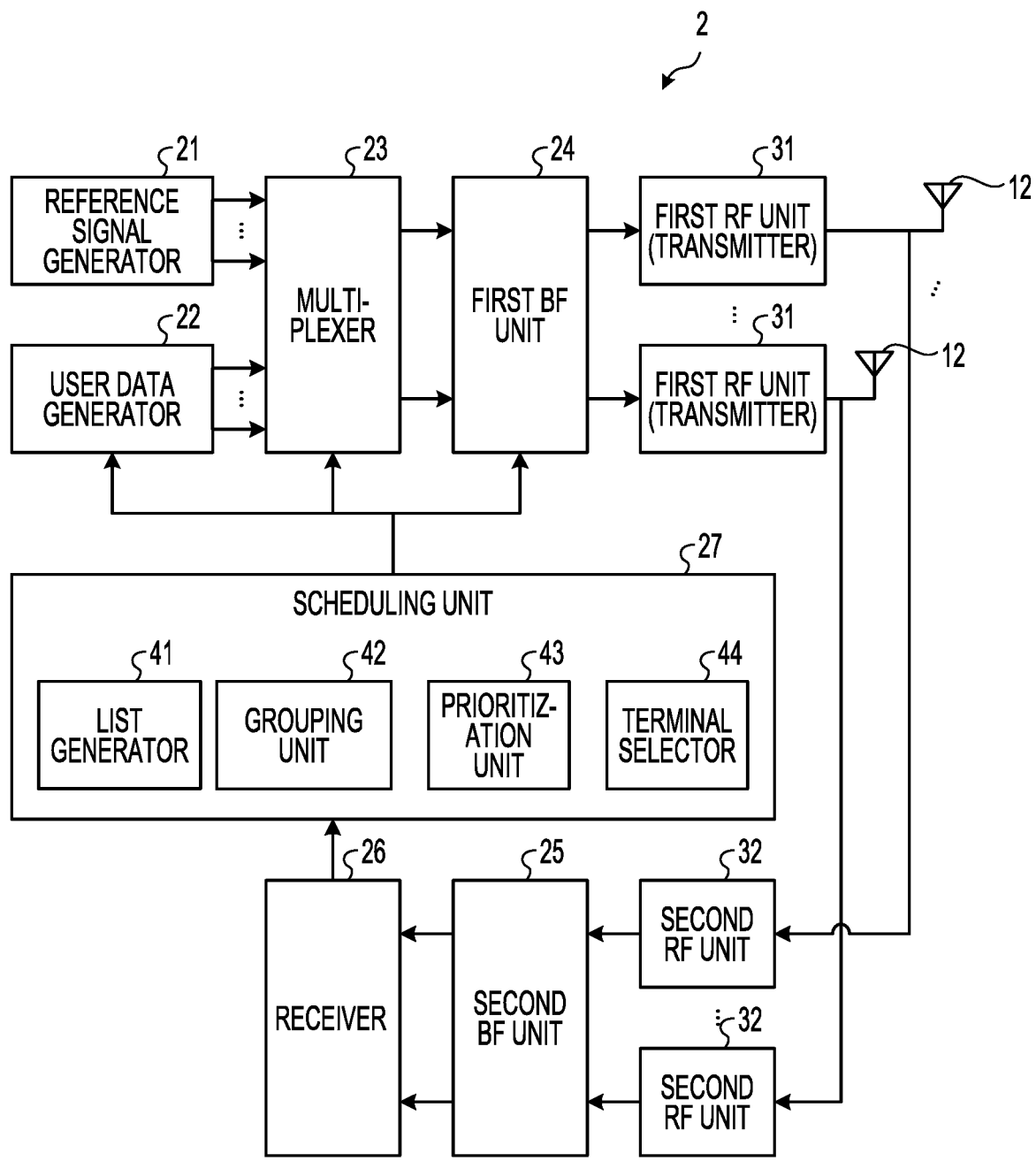
FIG. 3 is a block diagram illustrating an example of a functional configuration of the base station in the first embodiment.

FIG. 3 is a block diagram illustrating an example of a functional configuration of the base station 2. For example, by executing a program stored in the storage device 14, the base station 2 functions as a reference signal generator 21, a user data generator 22, a multiplexer 23, a first beam forming (BF) unit 24, a second BF unit 25, a receiver 26, and a scheduling unit 27. The wireless communication circuit 13 includes a plurality of first radio frequency (RF) units 31 and a plurality of second RF units 32. The scheduling unit 27 includes a list generator 41, a grouping unit 42, a prioritization unit 43, and a terminal selector 44.

The scheduling unit 27 selects K number of terminals 3 within the cover area A in which the MU-MIMO is performed, from the plurality of terminals 3 based on a predetermined selection algorithm. In addition, the predetermined selection algorithm may be, for example, a proportional fair algorithm using an estimated channel response vector, or a round robin algorithm that equally provides a communication opportunity. In the present embodiment, for the convenience of explanation, it is assumed that the predetermined selection algorithm is, for example, a round robin algorithm.

The reference signal generator 21 generates a reference signal for each selected terminal 3. The user data generator 22 generates a data signal for each selected terminal 3. The multiplexer 23 spatially multiplexes the reference signal and the data signal of each terminal 3 with different times or frequency resources. That is, the multiplexer 23 maps the reference signal and the data signal of each terminal 3 to subcarriers. The first BF unit 24 applies a predetermined beam to the reference signal and the data signal of each terminal 3. The first RF unit 31 is a transmitter that is provided for each antenna element 12 of each beam, converts the reference signal and the data signal into a wireless signal, and transmits the wireless signal to each terminal 3 via the antenna element 12 corresponding to the predetermined beam. The second RF unit 32 is provided for each antenna element 12 of each beam, and receives an incoming wireless signal.

The second RF unit 32 converts a reception signal including a channel state information (CSI) feedback signal from the terminal 3, into a baseband signal. The second BF unit 25 applies a beam with an optimum reception quality, to the reception signal from each terminal 3.

The receiver 26 obtains a reception state of each beam of each terminal 3, from CSI feedback signals from U number of terminals 3. Here, the reception state of each beam is an L1-reference signal received power (RSRP), a channel quality indicator (CQI) or the like which is measured by using the reference signal. In addition, the receiver 26 may cause each terminal 3 to feed back the reception states of all the beams or may designate reception states of top x beams excellent in the L1-RSRP or the CQI such that the reception states of the beams are fed back. In addition, the receiver 26 may designate one or more beam numbers such that reception states of the beams are fed back.

The scheduling unit 27 specifies an optimum beam number and a low interference beam number, for each terminal 3, based on the RSRP from the CSI feedback signal from each terminal 3. The optimum beam number is a beam number that identifies a beam in which a reception quality of the corresponding terminal 3 is optimum, among the plurality of beams. The low interference beam number is a beam number that identifies a beam in which a difference from the reception quality of the optimum beam of the corresponding terminal 3 is a predetermined threshold or more, that is, a beam which causes a low interference on the optimum beam used by the corresponding terminal 3, among the plurality of beams. The scheduling unit 27 manages a list 50, to be described later, which lists a group of beam numbers that identify an optimum beam and a low interference beam for each terminal 3. The scheduling unit 27 selects a terminal set for performing the MU-MIMO, from terminal sets in which optimum beams of terminals are included in low interference beams of the counterpart terminals, and applies the optimum beams so as to perform the MU-MIMO.

The scheduling unit 27 includes the list generator 41, the grouping unit 42, the prioritization unit 43, and the terminal selector 44. The list generator 41 generates the list 50. FIG. 4 is an explanatory view illustrating an example of the list 50. The list 50 illustrated in FIG. 4 is a list in which for each terminal number 51 that identifies the terminal 3, an optimum beam number 52 that identifies an optimum beam of each terminal 3 is associated with a low interference beam number 53 that identifies a low interference beam of each terminal 3. A group of the optimum beam numbers 52 is an optimum beam group S. Further, a group of the low interference beam numbers 53 is a low interference beam group X. The list generator 41 calculates the RSRP of each beam of each terminal 3 by using the L1-RSRP within the latest CSI feedback signal of the terminal 3. The list generator 41 specifies the optimum beam number 52 and the low interference beam number 53 of each terminal 3 by using the RSRP of each beam of the terminal 3.

The list generator 41 determines a beam number of a beam with an RSRP having the highest reception quality among RSRPs of beams of each terminal 3, as the optimum beam number. For example, an RSRP value of the beam #B of the terminal 3 #U is expressed as an RSRP$_{B, U}$. In addition, for the convenience of explanation, it is assumed that the list generator 41 uses the L1-RSRP in the latest CSI feedback signal of each terminal 3. However, for example, it is possible to use a moving average value of L1-RSRPs from past CSI feedback signals, or a weighted average value with an RSRP (L3-RSRP) of each beam, which is fed back via an upper layer with a cycle longer than a cycle of the L1-RSRP. The optimum beam #B$_{opt,U}$ of the terminal 3 #U is a beam in which the RSRP$_{B,U}$ is maximized. That is, the optimum beam B$_{opt,U}$ may be expressed by Equation 1.

[Equation 1]

$$B_{opt,U} = \arg \max(RSRP_{B,U}) \quad (1)$$

In addition, the list generator 41 determines a beam number of a beam with an RSRP having a reception quality satisfying a predetermined condition, among RSRPs of beams of each terminal 3, as the low interference beam. The low interference beam is a beam in which a difference from the reception quality of the optimum beam of the corresponding terminal 3 is a predetermined threshold or more, among the plurality of beams. That is, the low interference beam is a beam of which the interference influence on the optimum beam of the corresponding terminal 3 is a predetermined level or less. The low interference beam of the terminal 3 #U may be expressed by Equation 2.

[Equation 2]

$$RSRP_{B_{opt,U}} - RSRP_{B,U} > \Gamma_{th} \quad (2)$$

The predetermined threshold $\Gamma_{th}$ is a threshold used to determine whether a beam is a low interference beam. In addition, the predetermined threshold $\Gamma_{th}$ may be given as, for example, a parameter or may be set by a method to be described later. In addition, the low interference beam is exemplified as a beam with the L1-RSRP that is fed back, but may be a beam with no RSRP$_{B,U}$ value in a case where the L1-RSRP is not fed back or may be appropriately changed.

The grouping unit 42 refers to the list 50, and groups the terminals 3 of which optimum beams have the same beam number into the same group. For example, a group #B is a group of the terminals 3 of which optimum beams have, for example, the beam number #B. Referring to the list 50 illustrated in FIG. 4, for example, since the optimum beams of the terminals 3 #a and 3 #e have the optimum beam number "#1," the terminals 3 #a and 3 #e are grouped into the same group #1 with the same optimum beam. Further, since the low interference beams of the terminals 3 #a, 3 #d, and 3 #e have the low interference beam number "#4," the terminals 3 #a, 3 #d, and 3 #e are grouped into the same group #4 with the same low interference beam. The prioritization unit 43 gives priorities to groups or the terminals 3 in the same group when the terminal selector 44 performs a selection, based on a predetermined algorithm, for example, the round robin algorithm. In addition, for the priorities in group selection and terminal selection, for example, the proportional fair algorithm may be used instead of the round robin algorithm, and the algorithm may be appropriately changed.

The terminal selector 44 refers to the list 50, and selects a terminal set in which an optimum beam of one terminal 3 is included in a low interference beam of the other terminal 3, and an optimum beam of the other terminal 3 is included in a low interference beam of one terminal 3, as a terminal group for performing the MU-MIMO. For example, in a case where the number of terminals U=100 and the number of beams B=64, when the MU-MIMO is performed with K (K=2) terminals 3, the scheduling unit 27 may suppress a calculation amount to U*(B−1)=6300 times in determining a low interference beam at the time of list generation, and at most (B−1)$^2$=3969 times in determining a condition at the time of terminal set selection. In addition, in Patent Document 1, in a case where the number of terminals U=100 and the number of beams B=64, when the MU-MIMO is performed with K (K=2) terminals 3, an SINR is calculated 403,200 times at the time of reception quality table generation, and a channel capacity is calculated 8,064 times. Therefore, in the present embodiment, the calculation amount may be substantially reduced, as compared to Patent Document 1.

Figure 5A:
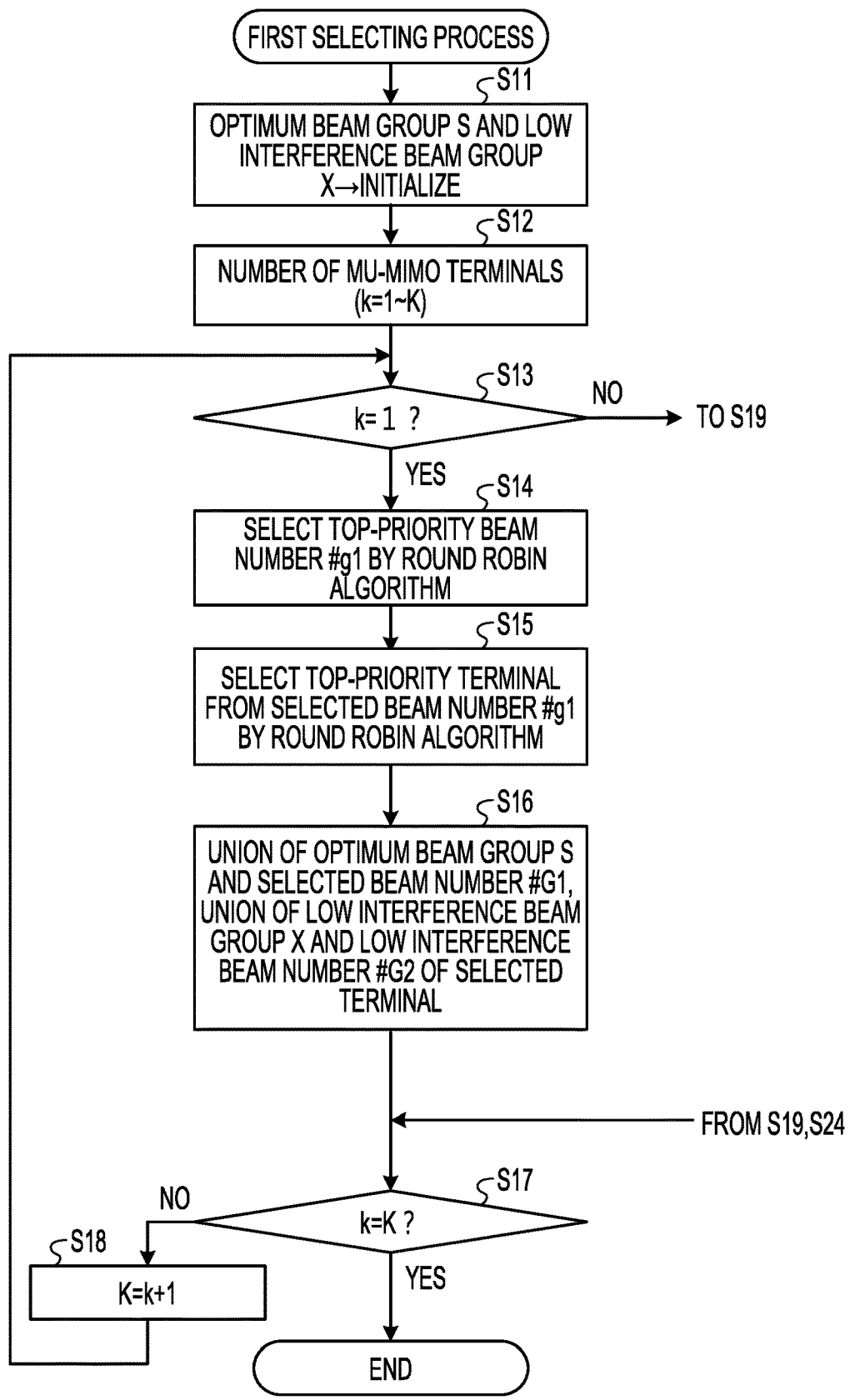
FIGS. 5A and 5B are a flowchart illustrating an example of a processing operation of the base station which is related to a first selecting process, in the first embodiment.
Figure 5B:
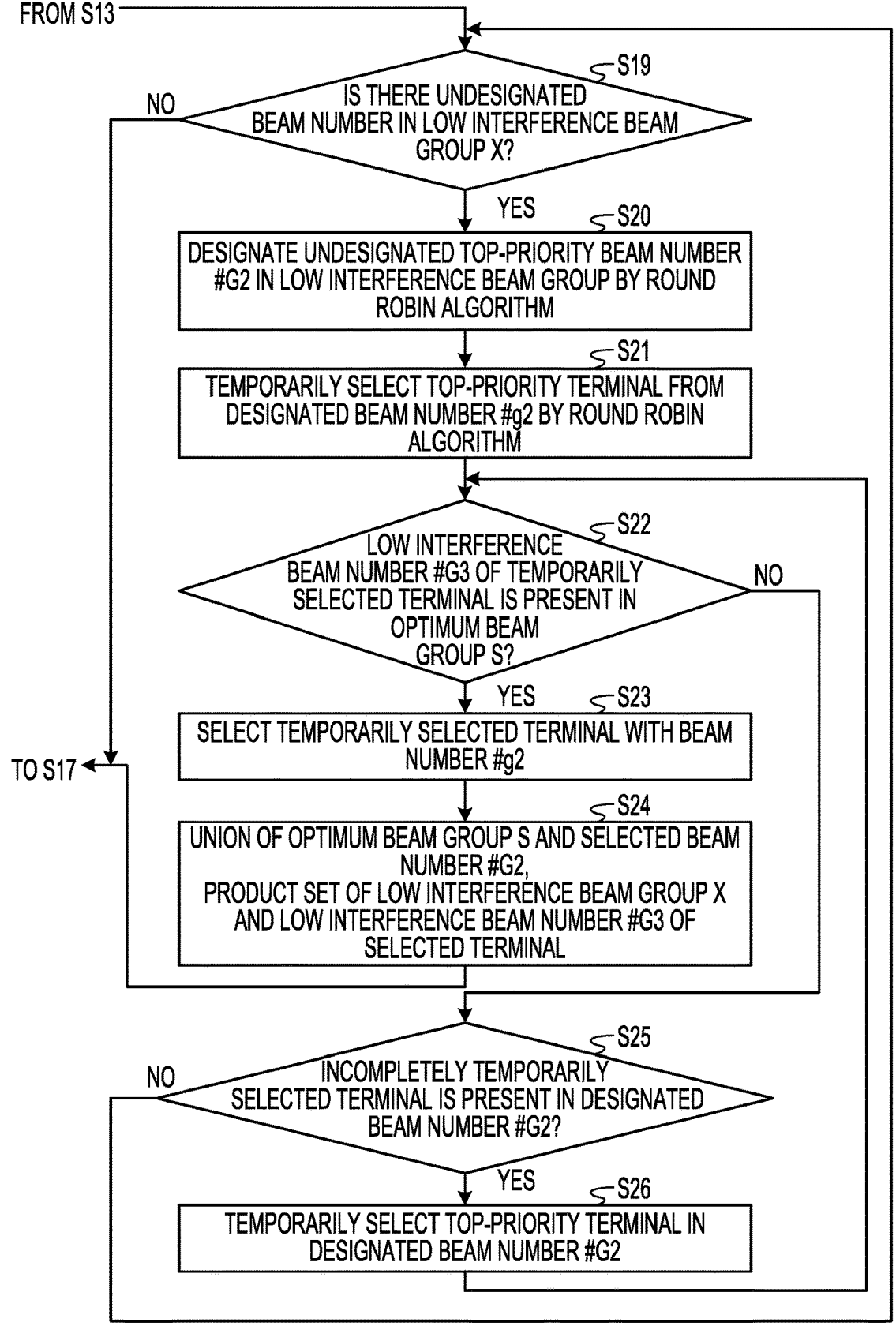

Next, descriptions will be made on an operation of the wireless system 1 in the first embodiment. FIGS. 5A and 5B are a flowchart illustrating an example of a processing operation of the base station 2 which is related to a first selecting process in the first embodiment. In FIGS. 5A and 5B, the scheduling unit 27 in the base station 2 initializes an optimum beam group S and a low interference beam group X (operation S11). In addition, the optimum beam group S is a group of beam numbers of optimum beams of the terminals 3, among a plurality of beams. The low interference beam group X is a group of beam numbers of low interference beams of the terminals 3, among the plurality of beams.

The terminal selector 44 in the scheduling unit 27 designates the selectable number of terminals 3 for performing the MU-MIMO (operation S12). In addition, the selectable number of terminals 3 for performing the MU-MIMO is a maximum number K of terminals 3 for performing the MU-MIMO. The terminal selector 44 determines whether the number of selections (k) of the terminals 3 for performing the MU-MIMO is 1 (operation S13). In addition, the number of selections (k) is the number of current selections.

When it is determined that the number of selections (k) of the terminals 3 for performing the MU-MIMO is 1 ("Yes" in operation S13), the terminal selector 44 selects a top-priority beam number #g1 among a plurality of beam numbers, based on the round robin algorithm (operation S14). In addition, the top-priority beam number is, for example, a beam number in the optimum beam group S. After selecting the top-priority beam number #g1, the terminal selector 44 selects a top-priority terminal 3 from the corresponding top-priority beam number #g1 based on the round robin algorithm (operation S15). Thus, the terminal selector 44 selects one terminal 3 of the terminal set for performing the MU-MIMO, in the processing of operation S15. As illustrated in the list 50 of FIG. 4, the terminal selector 44 sets the top-priority beam number #g1 to #1, and selects the terminal 3 #a.

The terminal selector 44 updates the optimum beam group S with a union of the optimum beam group S and the beam number #g1 selected in operation S14 (operation S16). Further, when the selected beam number #g1 is #1, the terminal selector 44 adds the beam number #1 to the optimum beam group S. Further, the terminal selector 44 updates the low interference beam group X with a union of a low interference beam number #g2 of the terminal 3 selected in operation S15 and the low interference beam group X. Further, the terminal selector 44 adds #3 and #4 as the low interference beam number #g2 of the selected terminal 3 #a, to the low interference beam group X. Then, the terminal selector 44 determines whether the number k of selections of the terminals 3 for performing the MU-MIMO is K (operation S17).

When it is determined that the number of selections (k) of the terminals 3 for performing the MU-MIMO is K ("Yes" in operation S17), the terminal selector 44 ends the processing operation illustrated in FIGS. 5A and 5B. When it is determined that the number of selections (k) of the terminals 3 for performing the MU-MIMO is not K ("No" in operation S17), the terminal selector 44 increments the number of selections (k) by one (operation S18). When it is determined that the number of selections (k) is not one ("No" in operation S13), the terminal selector 44 determines whether there is an undesignated beam number in the low interference beam group X (operation S19).

When it is determined that there is an undesignated beam number in the low interference beam group X ("Yes" in operation S19), the terminal selector 44 designates the undesignated top-priority beam number #g2 in the low interference beam group X based on the round robin algorithm (operation S20). For example, when there are undesignated beam numbers #3 and #4 in the low interference beam group X, the terminal selector 44 designates the beam number #3 as the undesignated top-priority beam number #g2 based on the round robin algorithm. The terminal selector 44 temporarily selects the top-priority terminal 3 from the designated top-priority beam number #g2 based on the round robin algorithm (operation S21). The terminal selector 44 temporarily selects the terminal 3 #c as the top-priority terminal 3 from the designated beam number #g3, based on the round robin algorithm.

The terminal selector 44 refers to the list 50, specifies the beam number #g3 of the low interference beam of the temporarily selected terminal 3, and determines whether the beam number #g3 of the low interference beam of the temporarily selected corresponding terminal 3 is present within the optimum beam group S (operation S22). Since the beam number #g3 of the low interference beam of the temporarily selected terminal 3 #c is the beam number #1, the terminal selector 44 determines whether the beam number #1 is present within the optimum beam group S. When it is determined that the beam number #g3 of the low interference beam of the temporarily selected terminal 3 is present within the optimum beam group S ("Yes" in operation S22), the terminal selector 44 selects the corresponding temporarily selected terminal 3 (operation S23). Thus, in the processing of operation S23, the terminal selector 44 selects one terminal 3 of the terminal set for performing the MU-MIMO. That is, the terminal selector 44 selects the terminal 3 #c. That is, in the example in FIG. 4, as the terminal set for performing the MU-MIMO, for example, the terminal 3 #a is selected for the beam number #1, and the terminal 3 #c is selected for the beam number #3.

After selecting the temporarily selected terminal 3, the terminal selector 44 updates the optimum beam group S with a union of the optimum beam group S and the beam number #g2 of the optimum beam of the terminal 3 selected in operation S23 (operation S24). The terminal selector 44 adds the beam number #3 of the terminal 3 #c to the optimum beam group S. Further, the terminal selector 44 updates the low interference beam group X with a product set of the beam number #g3 of the low interference beam of the terminal 3 selected in operation S23 and the low interference beam group X. The terminal selector 44 executes the product set of the beam number #1 of the low interference beam of the terminal 3 #c and the low interference beam group X. Then, after the processing of operation S24, the terminal selector 44 proceeds to operation S17 in order to determine whether the number of selections (k) of the terminals 3 for performing the MU-MIMO is K. When it is determined that there is no undesignated beam number in the low interference beam group X ("No" in operation S19), the terminal selector 44 proceeds to operation S17 in order to determine whether the number of selections (k) of the terminals 3 for performing MU-MIMO is K.

When it is determined that the beam number #g3 of the low interference beam of the corresponding temporarily selected terminal 3 is not present within the optimum beam group S ("No" in operation S22), the terminal selector 44 determines whether an incompletely temporarily selected terminal 3 is present in the beam number #g3 of the corresponding low interference beam (operation S25). In addition, the incompletely temporarily selected terminal 3 is a terminal 3 that has not been completely and temporarily selected. When it is determined that an incompletely temporarily selected terminal 3 is present in the beam number #g2 of the corresponding low interference beam ("Yes" in operation S25), the terminal selector 44 temporarily selects the top-priority terminal 3 in the beam number #g2 of the corresponding low interference beam based on the round robin algorithm (operation S26). Further, after temporarily selecting the top-priority terminal 3, the terminal selector 44 proceeds to operation S22 in order to determine whether the beam number of the low interference beam of the temporarily selected terminal 3 is present within the optimum beam group S. When it is determined that an incompletely temporarily selected terminal 3 is not present in the beam number #g2 of the low interference beam ("No" in operation S25), the terminal selector 44 proceeds to operation S19 in order to determine whether there is an undesignated beam number in the low interference beam group X.

The terminal selector 44 selects, for example, the top-priority beam number #g1 within the optimum beam group S, and selects the top-priority terminal 3 among the terminals 3 in the top-priority beam number #g1, as a k-th (k=1) terminal 3. In addition, the top-priority beam number is determined based on the round robin algorithm in scheduling units such as, for example, sub-frames, slots or mini-slots.

Next, the terminal selector 44 designates the beam number #g2 within the low interference beam group X of the low interference beams of the terminal 3 selected when k=1, as a k-th (k=2) terminal 3. The terminal selector 44 temporarily selects the top-priority terminal 3 among the terminals 3 in the beam number #g2. Further, the terminal selector 44 specifies the beam number #g3 of the low interference beam of the temporarily selected top-priority terminal 3, and determines whether the specified beam number #g3 of the low interference beam is present within the optimum beam group S of the terminal 3 selected when k=1. In addition, when the beam number #g3 of the low interference beam of the temporarily selected top-priority terminal 3 is present within the optimum beam group S of the terminal 3 selected when k=1, the terminal selector 44 selects the temporarily selected corresponding terminal 3. As a result, it is possible to select the terminal set of a maximum of K number of terminals in which optimum beams of the terminals 3 are included in low interference beams of the counterparts.

The scheduling unit 27 updates priorities of the terminals 3 within each group in the scheduling unit. For the update, the same algorithm as used at the time of prioritization, for example, the round robin algorithm, is used. In addition, the list generator 41 periodically updates the list 50 and the terminal group. The update period may be set as a parameter, and the update may be performed each time the CSI feedback signal is obtained from the terminal 3. The update processing of the list 50 is performed in the same manner as performed at the time of generation of the list 50. In addition, before the update, the predetermined threshold $\Gamma_{th}$ used in the Equation 2 is adjusted by using ACK (positive acknowledgement)/NACK (negative acknowledgement) fed back from the terminal 3 that has performed the MU-MIMO. The predetermined threshold $\Gamma_{th}(t)$ at a time point "t" of list update is calculated by the Equation 3.

[Equation 3]

$$\Gamma_{th}(t)=\Gamma_{th}(t-1)-\Delta_{th,NACK}(P_{th,NACK}-P_{NACK}) \quad (3)$$

Here, $\Delta_{th,NACK}$ is an update step size, and is set as a value larger than zero. $P_{th,NACK}$ is a target NACK rate, and is set in a range from zero to one. $P_{NACK}$ is a moving average value of NACK rates, and is calculated by (Equation 4) each time ACK/NACK is reported from the terminal 3.

[Equation 4]

$$P_{NACK}(n)=(1-\beta)P_{NACK}(n-1)+\beta\delta(n) \quad (4)$$

The "δ(n)" depends on the contents of ACK/NACK report #n, and takes zero for ACK and one for NACK. In addition, the scheduling unit 27 counts the number of NACKs generated when each terminal 3 has performed the MU-MIMO within the list update period, for each beam applied to others except for the terminal. In the terminal 3 #U, when the number of NACKs ($N_{NACK,B,U}$) of the beam number #B applied to others except for the terminal 3 #U is a preset value (a predetermined number of times) or more, the corresponding beam number #B is deleted from the low interference beam of the terminal 3 #U on the list 50. Further, the corresponding beam number #B is excluded from low interference beam candidates of the terminal 3 #U at the time of list update until the L1-RSRP of the corresponding terminal 3 #U is fed back.

In the first embodiment, the base station 2 generates the list 50 in which the optimum beam group S and the low interference beam group X are listed for each terminal 3. The base station 2 refers the list 50, and selects, for example, a terminal set in which an optimum beam of one terminal 3 is included in a low interference beam of the other terminal 3, and an optimum beam of the other terminal 3 is included in a low interference beam of one terminal 3, as a terminal set for performing the MU-MIMO. As a result, the calculation amount in selecting the terminal set for performing the MU-MIMO may be substantially reduced, as compared to the related art.

In addition, in the first embodiment, the scheduling unit 27 determines that the low interference beam is a beam in which a difference from the reception quality of the optimum beam of the terminal 3 is a predetermined threshold or more. However, the low interference beam may be a beam when the optimum beam of the terminal 3 is equal to or less than a predetermined value, or may be appropriately changed.

In addition, for the convenience of explanation, in the first embodiment, the scheduling unit 27 sets the number of terminals in the terminal set for performing the MU-MIMO, to K, for example, two. However, without being limited to two, the number of terminals may be, for example, one or three or more, or may be appropriately changed.

In the first embodiment, the scheduling unit 27 selects the terminals 3 for performing the MU-MIMO after grouping the terminals 3 by the beam numbers. However, it is possible to select the terminals 3 for performing the MU-MIMO without grouping the terminals 3 by the beam numbers, and an embodiment thereof will be described below as a second embodiment. In addition, the same components as those in the first embodiment will be denoted by the same reference numerals as used in the first embodiment, and descriptions of overlapping components and operations will be omitted.

Second Embodiment

Figure 6:
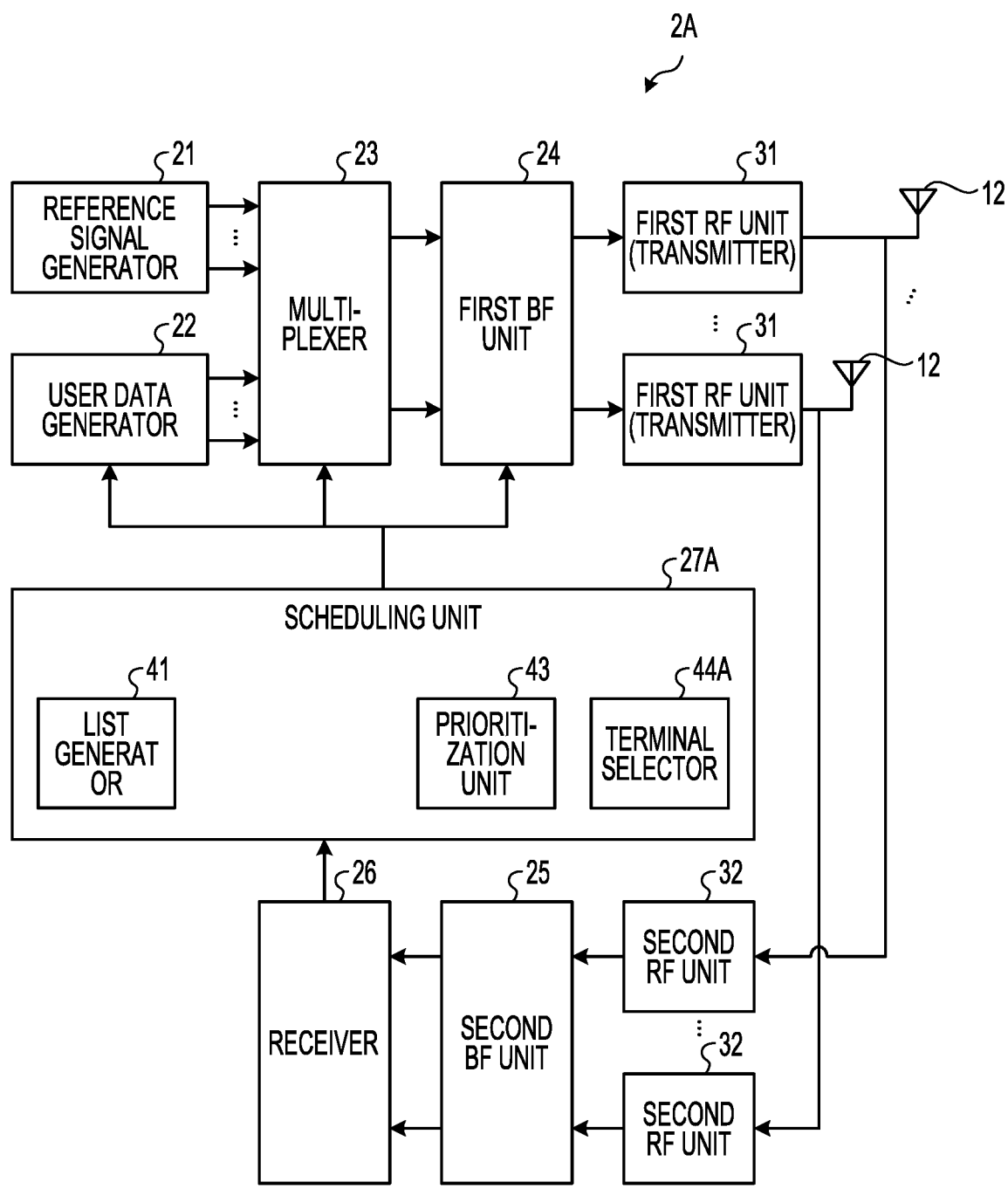
FIG. 6 is a block diagram illustrating an example of a functional configuration of a base station in a second embodiment.

FIG. 6 is a block diagram illustrating an example of a functional configuration of a base station 2A in the second embodiment. The base station 2A illustrated in FIG. 6 is different from the base station 2 illustrated in FIG. 3 in the inside of the scheduling unit 27A. The scheduling unit 27A includes the list generator 41, the prioritization unit 43, and a terminal selector 44A.

The terminal selector 44A refers to the list 50, and selects a terminal set in which an optimum beam of one terminal 3 is included in a low interference beam of the other terminal 3 and an optimum beam of the other terminal 3 is included in a low interference beam of one terminal 3, from a terminal group Y of all the terminals 3. Then, the terminal selector 44A selects the selected terminal set as a terminal set for performing the MU-MIMO.

Figure 7A:
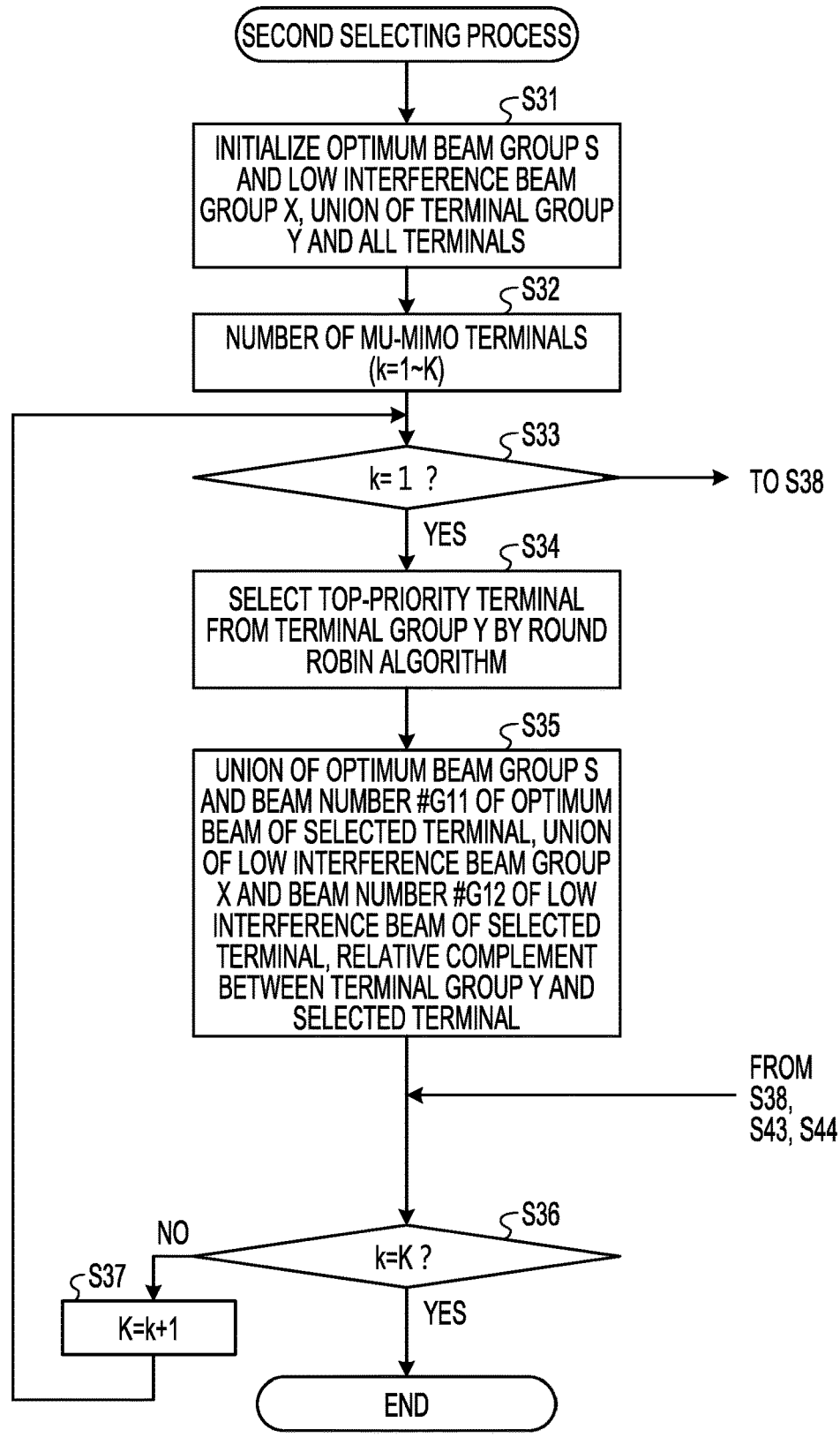
FIGS. 7A and 7B are a flowchart illustrating an example of a processing operation of the base station which is related to a second selecting process, in the second embodiment.
Figure 7B:
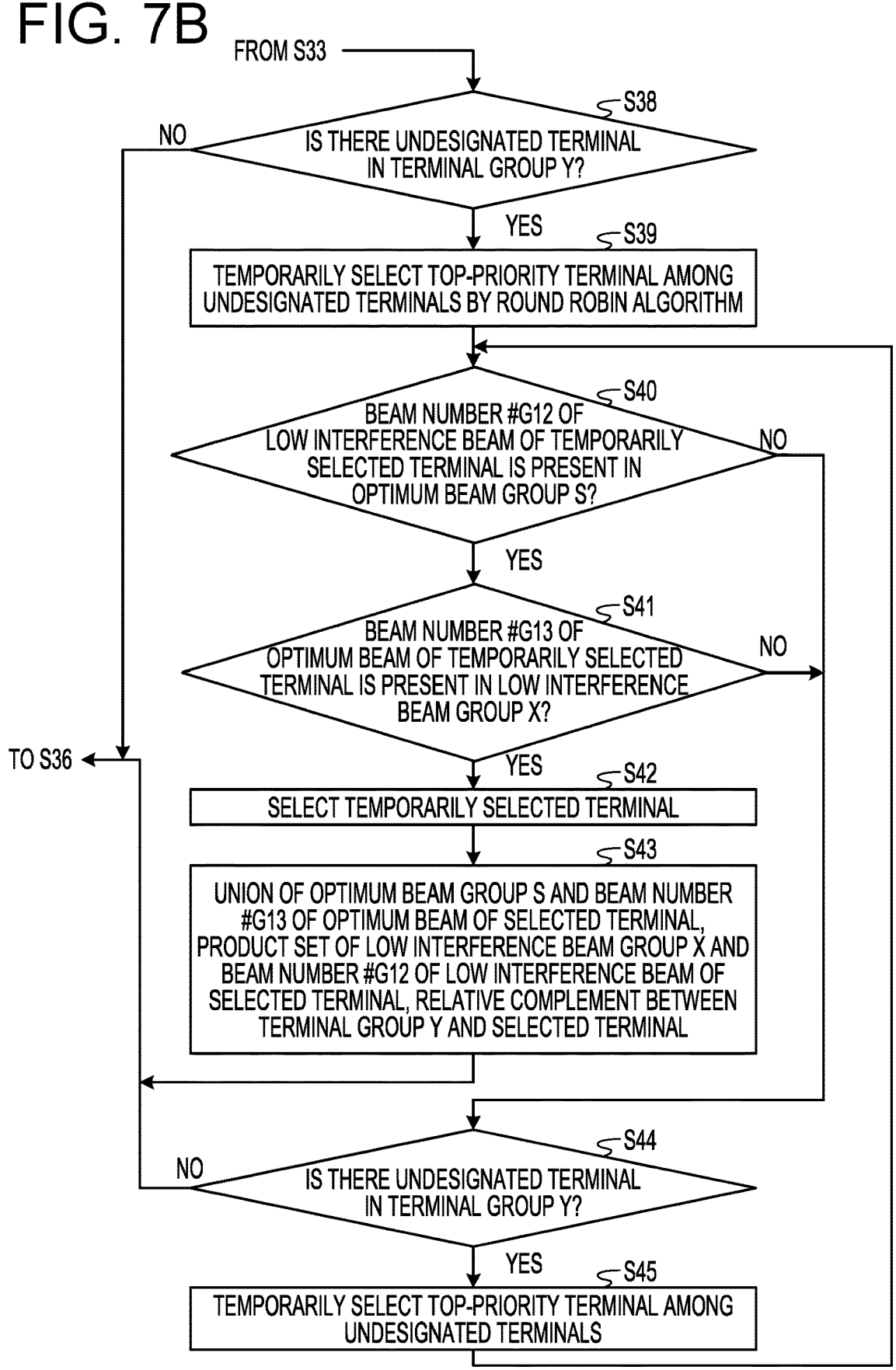

Next, descriptions will be made on an operation of the wireless system 1 in the second embodiment. FIGS. 7A and 7B are a flowchart illustrating an example of a processing operation of the base station 2A which is related to in a second selecting process in the second embodiment. In FIGS. 7A and 7B, the terminal selector 44A in the base station 2A initializes an optimum beam group S and a low interference beam group X, and updates the terminal group Y with a union of the terminal group Y and all the terminals 3 (operation S31). The terminal group Y is a group of numbers of all the terminals 3.

The terminal selector 44A designates the selectable number of terminals 3 for performing the MU-MIMO (operation S32). In addition, the selectable number of terminals 3 for performing the MU-MIMO is a maximum number of terminals 3 for performing the MU-MIMO. The terminal selector 44A determines whether the number of selections (k) of the terminals 3 for performing the MU-MIMO is one (operation S33). The number k of selections is the number of current selections.

When it is determined that the number k of selections of the terminals 3 for performing the MU-MIMO is one ("Yes" in operation S33), the terminal selector 44A selects a top-priority terminal 3 among all the terminals 3 within the terminal group Y, based on the round robin algorithm (operation S34). Thus, the terminal selector 44A selects one terminal 3 of a terminal set for performing the MU-MIMO. After selecting the top-priority terminal 3, the terminal selector 44A refers to the list 50, and designates a beam number #g11 of the optimum beam of the selected terminal 3. Further, the terminal selector 44A updates the optimum beam group S with a union of the designated beam number #g11 of the optimum beam and the optimum beam group S (operation S35). Further, the terminal selector 44A refers to the list 50, and designates a beam number #g12 of the low interference beam of the selected terminal 3. Then, the terminal selector 44A updates the low interference beam group X with a union of the designated beam number #g12 of the low interference beam and the low interference beam group X. Further, the terminal selector 44A updates the terminal group Y with a relative complement between the terminal number of the selected terminal 3 and the terminal group Y.

The terminal selector 44A determines whether the number k of selections of the terminals 3 for performing the MU-MIMO is K (operation S36). When it is determined that the number k of selections of the terminals 3 for performing the MU-MIMO is K ("Yes" in operation S36), the terminal selector 44A ends the processing operation illustrated in FIGS. 7A and 7B. When it is determined that the number of selections (k) of the terminals 3 for performing the MU-MIMO is not K ("No" in operation S36), the terminal selector 44A increments the number k of selections by one (operation S37). In addition, when it is determined that the number k of selections is not one ("No" in operation S33), the terminal selector 44A determines whether there is an undesignated terminal 3 in the terminal group Y (operation S38).

When it is determined that there is an undesignated terminal 3 in the terminal group Y ("Yes" in operation S38), the terminal selector 44A temporarily selects the undesignated top-priority terminal 3 in the terminal group Y based on the round robin algorithm (operation S39). The terminal selector 44A refers to the list 50, and determines whether the beam number #g12 of the low interference beam of the temporarily selected terminal 3 is present within the optimum beam group S (operation S40). When it is determined that the beam number #g12 of the low interference beam of the temporarily selected terminal 3 is present within the optimum beam group S ("Yes" in operation S40), the terminal selector 44A refers to the list 50. With reference to the list 50, the terminal selector 44A determines whether a beam number #g13 of the optimum beam of the temporarily selected terminal 3 is present within the low interference beam group X (operation S41). When it is determined that the beam number #g13 of the optimum beam of the temporarily selected terminal 3 is present within the low interference beam group X ("Yes" in operation S41), the terminal selector 44A selects the terminal 3 temporarily selected in operation S39 (operation S42). Thus, the terminal selector 44A selects one terminal 3 of the terminal set for performing the MU-MIMO in the processing of operation S42.

After selecting the temporarily selected terminal 3, the terminal selector 44A refers to the list 50, and designates the beam number #g13 of the optimum beam of the selected terminal 3. Further, the terminal selector 44A updates the optimum beam group S with a union of the designated beam number #g13 of the optimum beam and the optimum beam group S (operation S43). Further, the terminal selector 44A refers to the list 50, designates the beam number #g12 of the low interference beam of the selected terminal 3, and updates the low interference beam group X with a product set of the designated beam number #g12 of the low interference beam and the low interference beam group X. Further, the terminal selector 44A updates the terminal group Y with a relative complement between the terminal number of the selected terminal 3 and the terminal group Y. Then, after the processing in operation S43, the terminal selector 44A proceeds to operation S36 in order to determine whether the number k of selections of the terminals 3 for performing the MU-MIMO is K.

When it is determined that there is no undesignated terminal 3 within the terminal group Y ("No" in operation S38), the terminal selector 44A proceeds to operation S36 in order to determine whether the number of selections (k) of the terminals 3 for performing the MU-MIMO is K.

When it is determined that the beam number #g12 of the low interference beam of the temporarily selected corresponding terminal 3 is not present within the optimum beam group S ("No" in operation S40), the terminal selector 44A determines whether there is an undesignated terminal 3 within the terminal group Y (operation S44). When it is determined that there is an undesignated terminal 3 within the terminal group Y ("Yes" in operation S44), the terminal selector 44A temporarily selects the top-priority terminal 3 among the undesignated terminals 3 (operation S45). After temporarily selecting the top-priority terminal 3, the terminal selector 44A proceeds to operation S40 in order to determine whether the beam number #g12 of the low interference beam of the temporarily selected corresponding terminal 3 is present within the optimum beam group S.

When it is determined that the beam number #g13 of the optimum beam of the temporarily selected terminal 3 is not present within the low interference beam group X ("No" in operation S41), the terminal selector 44A proceeds to operation S44 in order to determine whether there is an undesignated terminal 3 in the terminal group Y. When it is determined that there is no undesignated terminal 3 in the terminal group Y ("No" in operation S44), the terminal selector 44A proceeds to operation S36 in order to determine whether the number of selections (k) of the terminals 3 for performing the MU-MIMO is K.

In addition, in the second embodiment, the top-priority terminal 3 is selected in the terminal group Y by using the round robin algorithm, but the present disclosure is not limited to the round robin algorithm. For example, the proportional fair algorithm may be employed, and the algorithm may be appropriately changed.

First, the terminal selector 44A selects the top-priority terminal 3 within the terminal group Y, as the k-th (k=1) terminal 3. Then, the terminal selector 44A searches the terminals 3 within the terminal group Y, other than the terminal 3 selected when k=1, as the k-th (k=2) terminal 3 in a descending order of priority. For the terminal 3 #U within the terminal group Y, it is determined whether the optimum beam of the terminal 3 selected when k=1 is included in the low interference beam of the terminal 3 #U, and it is determined whether the optimum beam of the terminal 3 #U is included in the low interference beam of the terminal 3 selected when k=1. Then, when this condition is met, the corresponding terminal 3 is selected. Then, the same determination processing is executed for a maximum of K terminals 3, and the terminal selection is ended. Here, in terminal selection when k>2, it is determined whether any beam of the optimum beam group S of the terminal 3 selected until k=1 is included in the low interference beam of the terminal 3 #U, and it is determined whether the optimum beam of the terminal 3 #U is included in a product set C of the low interference beam of the terminal 3 selected until k=1. Through the above-described processing, the terminal set of a maximum of K terminals, in which optimum beams of the terminals 3 are included in low interference beams of the counterpart terminals 3, is selected.

In the second embodiment, the base station 2A generates the list 50 in which the optimum beam group S and the low interference beam group X are listed for each terminal 3. The base station 2 refers to the list 50, and selects, for example, a terminal group in which an optimum beam of one terminal 3 is included in a low interference beam of the other terminal 3, and an optimum beam of the other terminal 3 is included in a low interference beam of one terminal 3, as a terminal set for performing the MU-MIMO. As a result, the calculation amount in selecting the terminal set for performing the MU-MIMO may be substantially reduced, as compared to the related art.

In the base station 2 of the first embodiment described above, the optimum beam and the low interference beam are specified for each terminal 3. However, information on the optimum beam and the low interference beam may be fed back from each terminal 3, and an embodiment thereof will be described below as a third embodiment. In addition, the same components as those in the first embodiment will be denoted by the same reference numerals as used in the first embodiment, and descriptions of overlapping components and operations will be omitted.

Third Embodiment

Figure 8:
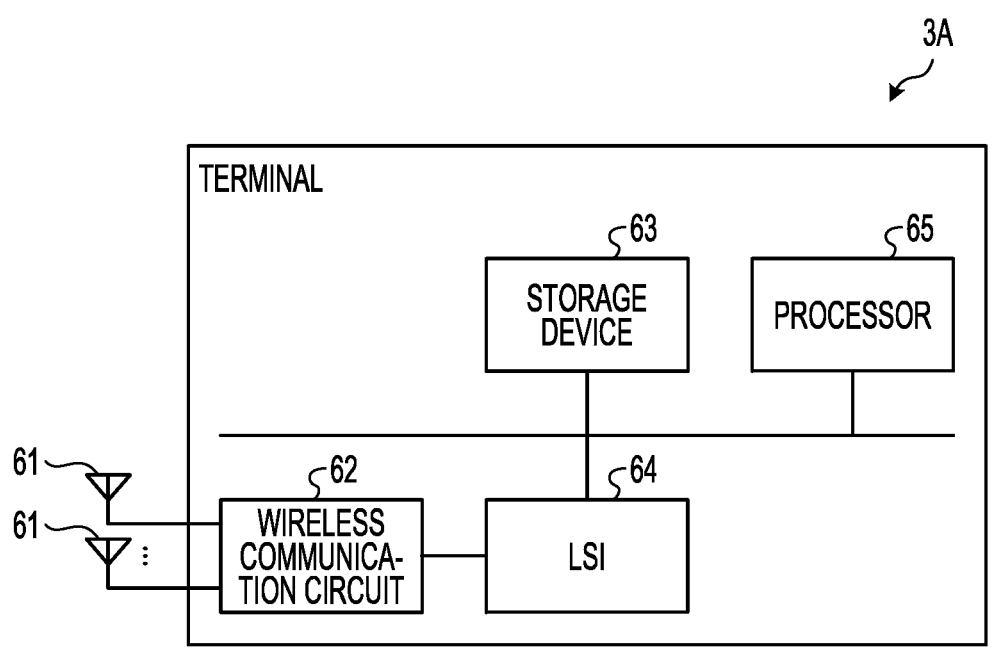
FIG. 8 is a block diagram illustrating an example of a hardware configuration of a terminal in a third embodiment.

FIG. 8 is a block diagram illustrating an example of a hardware configuration of a terminal 3A in the third embodiment. The terminal 3A illustrated in FIG. 8 includes a plurality of antenna elements 61, a wireless communication circuit 62, a storage device 63, an LSI 64, and a processor 65. The wireless communication circuit 62 is an IF circuit that is in charge of a wireless communication with the base station 2 via the antenna elements 61. The storage device 63 is a device that stores various pieces of information. The LSI 64 is a circuit that executes various controls. The processor 65 controls the entire terminal 3A.

Figure 9:
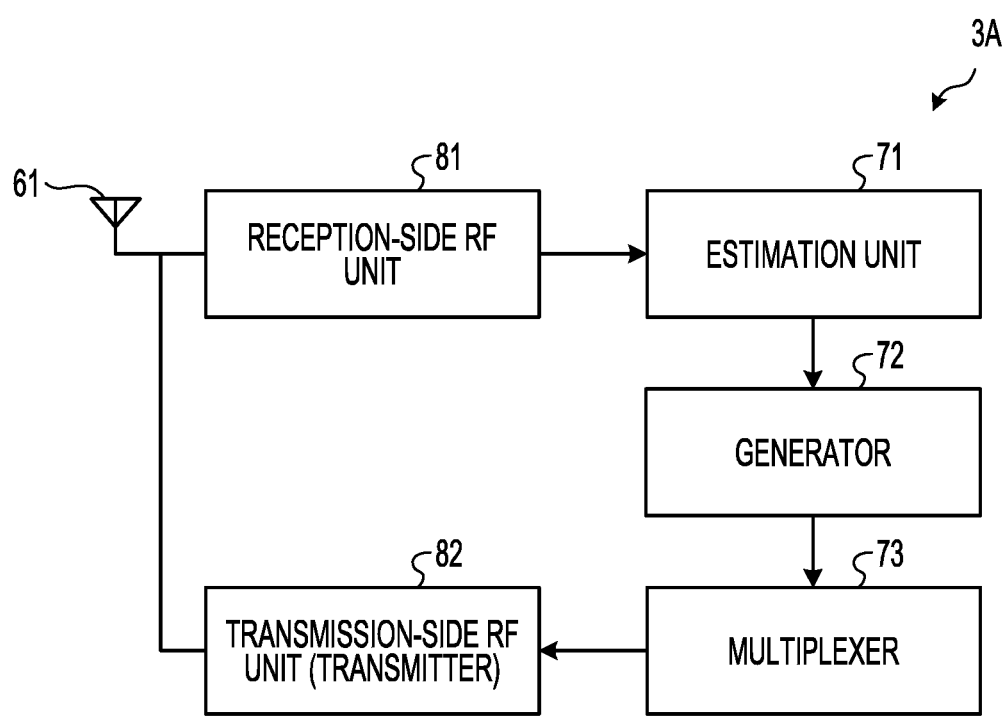
FIG. 9 is a block diagram illustrating an example of a functional configuration of the terminal in the third embodiment.

FIG. 9 is a block diagram illustrating an example of a functional configuration of the terminal 3A. The terminal 3A illustrated in FIG. 9 functions as an estimation unit 71, a generator 72, and a multiplexer 73 by executing, for example, a program stored in the storage device 63. The wireless communication circuit 62 includes a reception-side RF unit 81 and a transmission-side RF unit 82.

The reception-side RF unit 81 receives a reception signal including a reference signal from the base station 2 via the antenna element 61, and converts the received reception signal into a baseband signal. The estimation unit 71 calculates reception states (L1-RSRP and CQI) of B beams by using the reference signal applied to each beam. The generator 72 performs a determination of an optimum beam and a low interference beam and coding•modulation of such information. For a value $RSRP_{B,U}$ of an RSRP of the beam number #B of the terminal 3A #U, which is used for the beam determination, an L1-RSRP obtained from the recently received reference signal may be used, or a moving average value with previously obtained L1-RSRPs may be used. In addition, it is also possible to use a weighted average value with the RSRP (L3-RSRP) of each beam, which is fed back via an upper layer with a cycle longer than a cycle of the L1-RSRP. In addition, the optimum beam $\#B_{opt,U}$ of the terminal 3A #U is determined by (Equation 1). An arbitrary beam number #B satisfying (Equation 2) is set as a low interference beam of the terminal 3A #U. Here, the predetermined threshold $\Gamma_{th}$ is a threshold used to determine whether a beam is a low interference beam, and may be notified as a parameter from the base station 2 or may be adjusted by the above-described method.

The multiplexer 73 multiplexes a feedback signal with allocated frequency resources. The transmission-side RF unit 82 performs a conversion into a wireless signal and transmits the wireless signal from the antenna element 61. As a result, the receiver 26 within the base station 2 demodulates the feedback signal from the terminal 3A. The scheduling unit 27 in the base station 2 may list the optimum beam and the low interference beam notified from the terminal 3.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus comprising:
a transmitter configured to generate a plurality of beams by a plurality of antenna elements so as to transmit a data signal addressed to a plurality of terminal devices;
a memory; and
a processor coupled to the memory and configured to:
select a combination of terminal devices, among the plurality of terminal devices, to which the data signal is transmitted by spatially multiplexed, based on information for each terminal device in which a first beam in which a reception quality of the each terminal device is maximized among the plurality of beams is associated with a second beam group including one or more second beams in which a difference from the reception quality of the first beam is equal to or larger than a predetermined value among the plurality of beams,
wherein the predetermined value is a threshold used to determine whether a second beam causes a low interference on the first beam.

2. The base station apparatus according to claim 1, wherein the processor is configured to select the combination of terminal devices including a first terminal device and a second terminal device among the plurality of terminal devices, the first beam of the first terminal device being included in the second beam group of the second terminal device, and the first beam of the second terminal device being included in the second beam group of the first terminal device.

3. The base station apparatus according to claim 1, wherein the processor is configured to adjust the predetermined value, based on information of positive acknowledgement (ACK) or negative acknowledgement (NACK) of data fed back from the terminal devices.

4. The base station apparatus according to claim 1, wherein the processor is configured to delete, when a number of times of negative acknowledgement (NACK) of data fed back from the terminal devices is equal to or greater than a predetermined number of times, beams corresponding to a number of which the number of times of NACK is equal to or greater than the predetermined number of times, from the second beam group.

5. A selection method performed in a base station apparatus including a transmitter configured to generate a plurality of beams by a plurality of antenna elements so as to transmit a data signal addressed to a plurality of terminal devices, the selection method comprising:
selecting a combination of terminal devices, among the plurality of terminal devices, to which the data signal is transmitted by spatially multiplexed, based on information for each terminal device in which a first beam in which a reception quality of each terminal device is maximized among the plurality of beams is associated with a second beam group including one or more second beams in which a difference from the reception quality of the first beam is equal to or larger than a predetermined value among the plurality of beams, by a processor, wherein the predetermined value is a threshold used to determine whether a second beam causes a low interference on the first beam.

6. A terminal device comprising:

a memory;

a processor coupled to the memory and configured to:

estimate a reception state of each beam from a reference signal applied to the each beam, the each beam being one of a plurality of beams generated by a base station apparatus, and generate beam information in which to a first beam in which a reception quality for the base station apparatus is maximized among a plurality of beams is associated with one or more second beams in which a difference between the reception quality for the base station apparatus and the reception quality of the first beam is equal to or larger than a predetermined value among the plurality of beams, from the reception state of the each beam; and a transmitter configured to transmit the generated beam information to the base station apparatus, wherein the predetermined value is a threshold used to determine whether a second beam causes a low interference on the first beam.

* * * * *